United States Patent [19]

Winchester

[11] 4,296,960
[45] Oct. 27, 1981

[54] INFLATABLE CAMPER

[76] Inventor: Loren R. Winchester, 105 Southwest St., Yorktown, Ind. 47396

[21] Appl. No.: 77,857

[22] Filed: Sep. 21, 1979

Related U.S. Application Data

[63] Continuation-in-part of Ser. No. 52,486, Jun. 7, 1979, abandoned.

[51] Int. Cl.³ .................................................. B60P 3/32
[52] U.S. Cl. ........................................ 296/167; 52/2; 135/1 A; 296/156
[58] Field of Search ................ 296/164–167, 296/100, 156; 52/2; 135/1 A, 5 A, 6, 7

[56] References Cited

U.S. PATENT DOCUMENTS

| | | | |
|---|---|---|---|
| 2,754,836 | 7/1956 | Darby | 52/2 |
| 2,819,724 | 1/1958 | Barker | 52/2 |
| 3,393,479 | 7/1968 | Slotnick | 52/2 |
| 3,402,960 | 9/1968 | Erke | 52/2 X |
| 3,473,839 | 10/1969 | Elble | 296/164 X |
| 3,850,471 | 11/1974 | Johnson | 296/167 X |
| 3,871,399 | 3/1975 | Watson | 296/164 X |
| 4,000,585 | 1/1977 | Denaro | 52/2 |
| 4,093,302 | 6/1978 | Adams | 52/2 X |

Primary Examiner—Joseph F. Peters, Jr.
Assistant Examiner—Donald W. Underwood
Attorney, Agent, or Firm—Gunn, Lee & Jackson

[57] ABSTRACT

This invention relates to an inflatable camper that may be used in conjunction with pickup trucks. A flat section of flexible material with magnetic strips is used to attach the camper to the bed of a pickup truck. Extending upward from the flat section of flexible material are inflatable walls that have internal shape forming walls therein to prevent overinflation of any particular portion of the inflatable walls. The internal shape forming walls allow pressurized air to flow therethrough to other sections of the inflatable walls. The inflatable walls connect to an inflatable top that likewise has internal shape forming walls located therein. Flexible transparent windows are located in portholes in the sides of the flexible walls, as well as a flexible transparent door being located in an entrance for the inflatable camper. Both the flexible transparent windows and door may be unzipped and either removed or moved to one side with screens remaining to protect against insects. A quick disconnect valve allows the inflatable camper to be inflated by a source of pressurized air.

4 Claims, 9 Drawing Figures

INFLATABLE CAMPER

This patent application is a continuation-in-part of U.S. Pat. application Ser. No. 52,486 deposited on June 7, 1979 entitled "Camping Equipment" by the same inventor and now abandoned.

BACKGROUND OF THE INVENTION

This invention relates to camping equipment and, more particularly, to an inflatable camper that may be used in conjunction with pickup trucks.

BRIEF DESCRIPTION OF THE PRIOR ART

The recreational vehicle industry has been booming in recent years with many different types of recreational vehicles having been designed and introduced into the market. Initially, recreational vehicles were predominantly trailers that were attached to standard automobiles for the household. As time and technology progressed, complete mobile homes that would be pulled by automobiles were introduced into the market. These were followed by motor homes that would contain many of the conveniences of home, yet could be driven to any section of the country by the owner and still maintain many of the conveniences of home.

As this technology concerning recreational vehicles advanced, so did their price. The need for an inexpensive recreational vehicle developed that would provide more conveniences than camping out in a tent, yet still be tremendously less expensive than motor homes or mobile homes. Foldout and prop-up travel trailers have developed in the recreational vehicle industry, but are again fairly expensive and inconvenient to use. Also, they have the normal inconveniences that a towed vehicle will have as far as operation of the towing vehicle.

An alternative that has developed in recent years is to have a rigid camper shell that may be placed in the bed of a pickup truck. With the increased popularity of pickup trucks, so has the popularity of campers for pickup trucks increased. However, the campers or camper shells for pickup trucks have many inconveniences, such as (1) making the pickup truck hard to handle, (2) expensive, (3) being difficult to install and remove, (4) difficult to store, just to name a few.

SUMMARY OF THE INVENTION

It is an object of the present invention to provide an inflatable type camper for use with pickup trucks.

It is another object of the present invention to provide an inflatable type camper that may be folded up into a convenient type bundle and subsequently unfolded upon arriving at a destination and inflated in the bed of a pickup truck to form a camper similar in external shape to a pickup truck camper.

It is still another object of the present invention to provide an inflatable type camper that has shape forming inner walls to insure that the camper forms the same external configuration as a pickup truck camper shell, plus adding additional strength to the overall structure.

It is yet another object of the present invention to provide flexible and removable transparent windows and doors, as well as insect screens and portholes and entrance to an inflatable camper.

The inflatable camper is designed so that it may be wrapped into a relatively small package and carried in the pickup truck until arriving at a desired campsite, then unfolded in the rear of the pickup truck. By connection of a quick disconnect valve to a source of pressurized air, such as a portable DC compressor, the inflatable camper is then inflated. Upon inflation, the inflatable camper forms an external configuration similar to a pickup camper shell. Shape forming inner walls located in the side walls and roof of the inflatable camper help insure the proper configuration of the inflatable camper, plus add strength to the entire camper by way of structural support. The shape forming inner walls must be flexible and allow passage of the pressurized air to the various sections of the inflatable camper.

Portholes in the side of the inflatable camper have flexible transparent windows therein that can be unzipped on the side and lower portions thereof and rolled upward and secured at the top of their respective porthole to allow air flow into the camper. Flexible screens located inside of the flexible transparent windows in the portholes prevent insects from coming inside of the camper.

Likewise, the entrance for the camper, which is at the rear thereof with respect to the pickup truck, has a flexible transparent door therein that may be unzipped and either removed or tied to one side. Also located in the entrance way is a flexible screen material that may likewise be unzipped and either removed or moved to one side thereof for entrance into the camper.

The bottom of the camper has a flat section of flexible material with magnetic strips that attach to the bed and cab of the truck. The magnetic strips insure that the entire camper remains securely in position when inflated. No inflation is necessary for the lower portion of the inflatable camper with that particular portion simply unfolding to conform with the bed of the truck. Tie downs are located on the side of the camper and are used to further secure the camper to the sides of the truck in case of high winds.

It is anticipated that a portable compressor operated off of the battery of the pickup truck would be used to inflate the camper through a quick disconnect valve. Such a portable compressor may be obtained commercially; however, it is recommended that the motor of the truck be running at the time of inflation of the camper to insure that the battery of the truck is not discharged to the point that it will no longer start the truck.

DESCRIPTION OF THE PREFERRED EMBODIMENT

Figure 1:
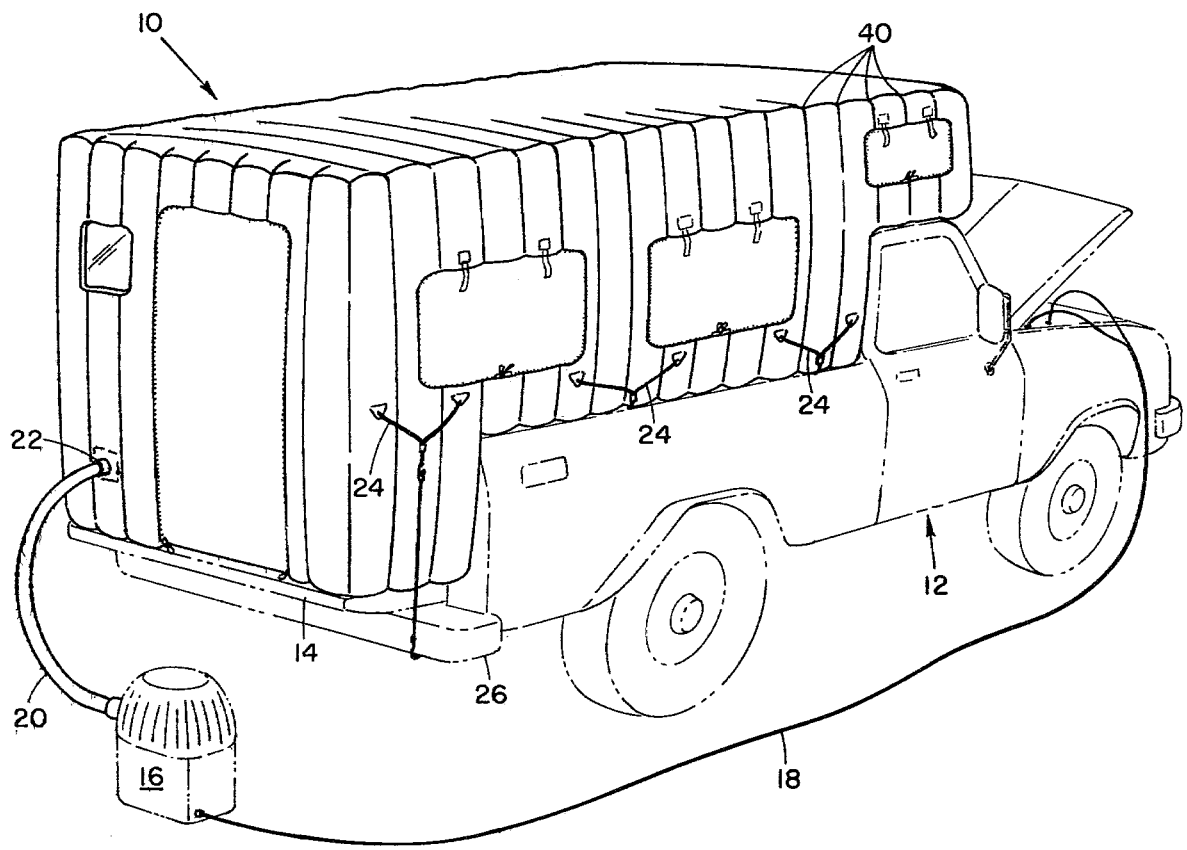
FIG. 1 is a perspective view of an inflatable camper almost fully inflated in position on a pickup truck.

Referring to FIG. 1, a perspective view of the inflatable camper represented generally by reference numeral 10 is shown in the bed of a pickup truck 12. The tailgate 14 of the pickup truck is lowered to the horizontal position to make room for the inflatable camper 10. A portable compressor 16 that operates off of a standard 12 volt battery is connected to the battery (not shown) of the truck through electrical cable 18. From the portable compressor 16, there is a connection to the inflatable camper 10 by means of hose 20 by means of a quick disconnect valve 22. Tie downs 24 are located on each side of the inflatable camper and may be used to anchor the inflatable camper to the sides of the pickup truck 12 or the bumper 26. The tie downs 24 are anchored to the sides of the inflatable camper 10.

Figure 2:
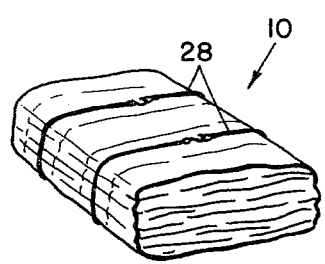
FIG. 2 is a perspective view of the inflatable camper folded up for either storage or transportation to a new location.
Figure 3:
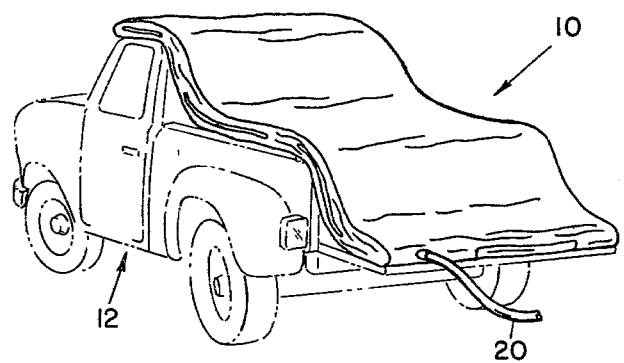
FIG. 3 is a perspective view of the inflatable camper in position on a pickup truck immediately prior to inflation.

While the general external configuration of the inflatable camper 10 is shown in FIG. 1 along with at least one means of inflation of the inflatable camper 10, the inflatable camper 10 when not in use, being transported, or stored, is normally in a configuration as shown in FIG. 2. The inflatable camper may be folded up into a bundle and held together by straps 28. By undoing the straps 28 and unfolding the inflatable camper 10, it may be spread in the bed of the pickup truck 12 as shown in FIG. 3. Thereafter, by connection of the hose 20 to inflatable camper 10 via quick disconnect valve 22 and operation of the compressor 16 (see FIG. 1), the inflatable camper 10 may be inflated to the position as shown in FIG. 1.

Figure 4:
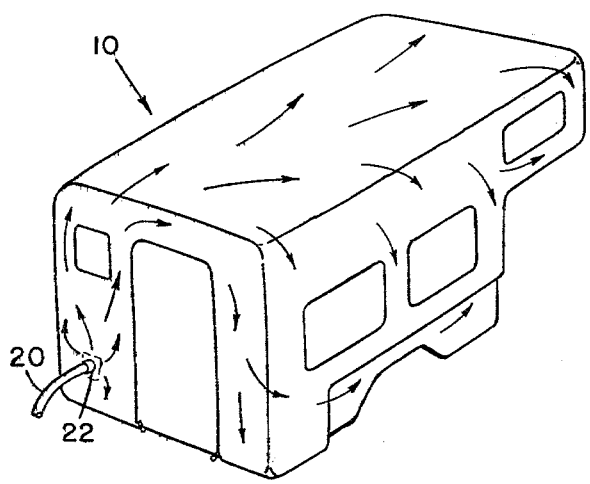
FIG. 4 is a perspective view of the inflatable camper showing air flow therethrough during inflation.
Figure 5:
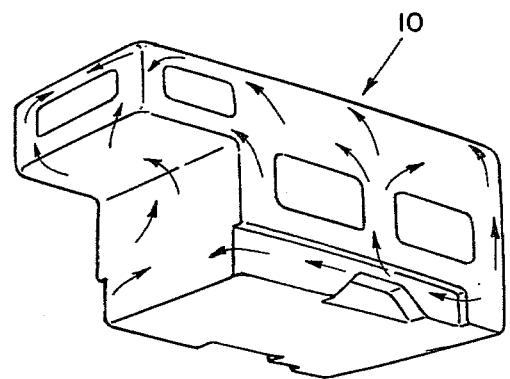
FIG. 5 is an opposing perspective view from FIG. 4 showing air flow therethrough during inflation.
Figure 6:
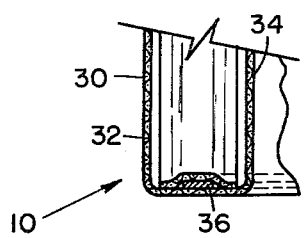
FIG. 6 is a partial sectional view illustrating wall construction of the inflatable camper.

Referring now to FIGS. 4 and 5 in combination, opposing perspective views of the inflatable camper 10 are shown. The purpose of FIGS. 4 and 5 are to show how the pressurized air from hose 10, which connects through quick disconnect valve 22, spreads throughout the inflatable camper 10. The direction of the arrows represent generally the direction of air flow. Referring to FIG. 6, there is shown a lower side partial cross-sectional view of one of the inflatable walls 30 of the inflatable camper 10. The pressurized air is located inside of inflatable wall 30 between outer wall 32 and inner wall 34. Also located at the bottom of the inflatable wall 30 is a magnetic strip 36 as will subsequently be explained in more detail.

Figure 7:
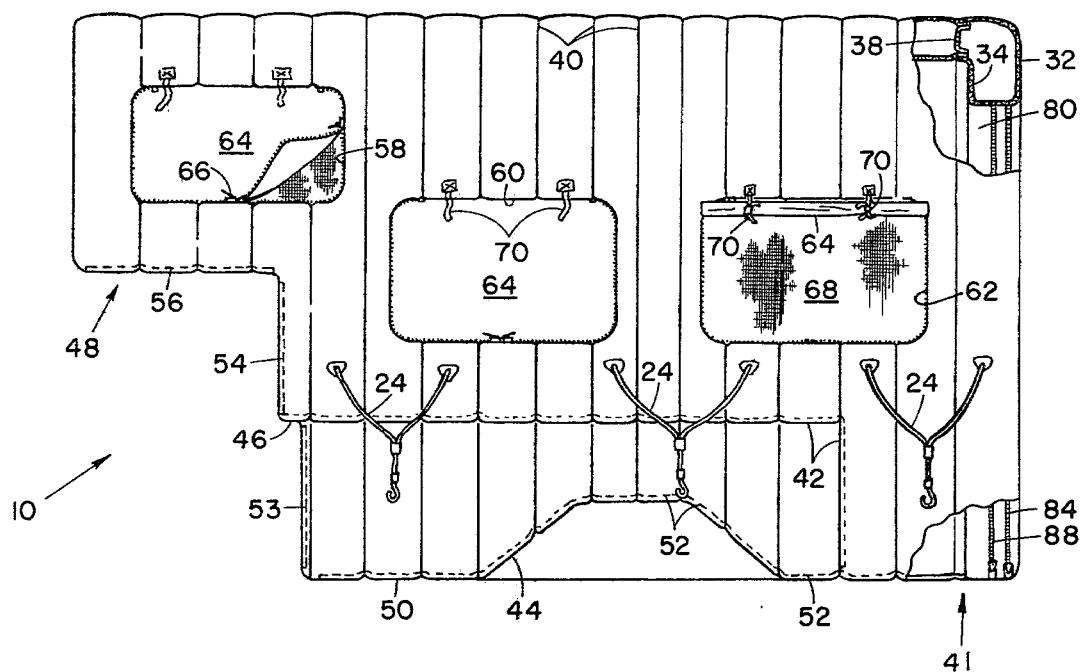
FIG. 7 is an elevated side view of the inflatable camper in the inflated condition.
Figure 8:
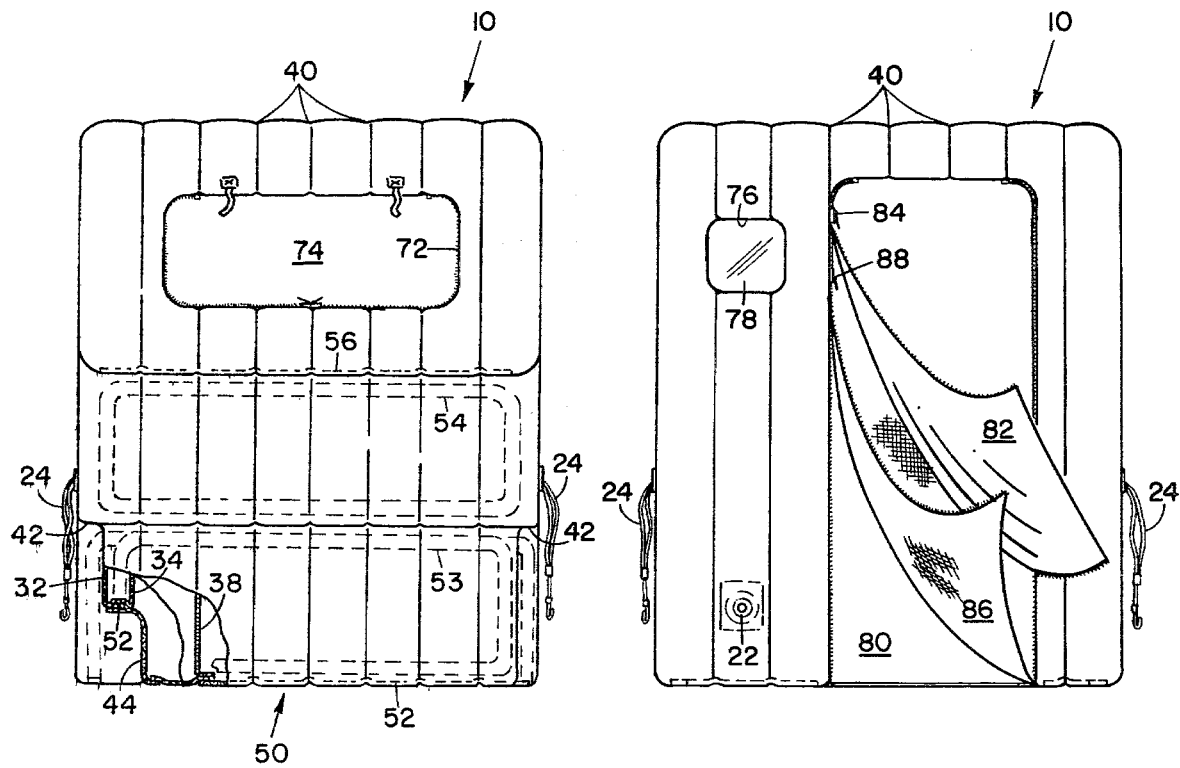
FIG. 8 is an elevated front view of the inflatable camper in an inflated condition.
Figure 9:
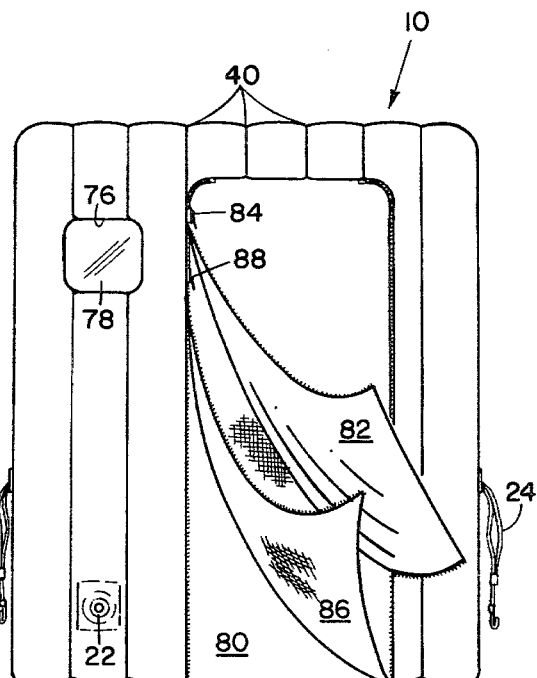
FIG. 9 is an elevated rear view of the inflatable camper in an inflated condition with a flexible transparent door and flexible screen being partially opened.

Referring now to FIGS. 7, 8 and 9 in combination, the inflatable camper 10 will be explained in further detail. Like numerals previously used to designate like parts will again be used. Referring to the upper cutaway section of FIG. 7, the outer wall 32 and inner wall 34 of the inflatable camper 10 can be seen in more detail. To prevent against overinflation of any particular portion of the inflatable camper 10 and to insure that the inflatable camper 10 conforms to the desired configuration, shape forming internal walls 38 are located between the inner walls 34 and outer walls 32. The shape forming internal walls 38 are contained along each of the seams 40 of the inflatable camper 10. The shape forming inner walls 38 must be porous to allow air flow therethrough to inflate the inflatable camper 10 as shown and explained in conjunction with FIGS. 4 and 5.

In external configuration, the inflatable camper 10 has a rearmost portion 41 that extends over the tailgate 14 of the pickup truck 12 as can be seen in FIG. 1. However, because the sides of the pickup truck bed may not be as wide as the rearmost portion 40, a recess 42 is provided to accommodate the sides of the pickup truck bed. A wheel well recess 44 is also provided to fit over the hump inside of the pickup truck bed that is required to accommodate the wheel wells. Extending upward over the front wall of the pickup truck bed is a shoulder 46 to extend the inflatable camper 10 a couple of inches forward so that it may fit snug with the back of the cab for the pickup truck 12. The forwardmost portion 48 of the inflatable camper 10 extends over the top of the cab of the pickup truck 12.

Contained in the bottom 50 of the inflatable camper 10 are magnetic strips 52 that help secure the inflatable camper 10 in position on the pickup truck bed. Also, magnetic strips 53, 54, and 56 are provided to secure the inflatable camper 10 to the front wall of the bed of the pickup truck, to the back of the cab of the pickup truck, and to the top of the cab of the pickup truck, respectively. The magnetic strips 52, 53, 54, and 56 provide additional strength to hold the inflatable camper 10 in position along with the tie down 24 on each side of the inflatable camper.

On both sides of the inflatable camper, there is a series of portholes 58, 60 and 62. Over each of the portholes is removably secured a flexible transparent window 64 that may be connected by any convenient means, such as zipper 66. Secured in position inside of the flexible transparent window 64 inside of the respective portholes 58, 60 or 62 is located screens 68. By unzipping the flexible transparent window 64 on the bottom and two sides, the flexible transparent window 64 may be rolled upward and secured by tie strings 70 as shown for porthole 62 of FIG. 7.

There is also porthole 72 in the front along with flexible transparent window 74 and internal screen (not shown). Likewise, there is a small porthole 76 in the rear with flexible transparent window 78.

In the rear of the inflatable camper 10 is located entrance 80 that has a flexible transparent door 82 removably secured in the entrance 80 by any suitable means, such as a zipper 84. Also inside of the flexible transparent door 82 is contained a flexible screen 86 that again may be secured by any convenient means, such as zipper 88.

During hot weather, the flexible transparent windows 64 may be unzipped and rolled upward and secured by tie strings 70 and the flexible transparent door 82 either removed or moved to one side to allow air flow through the inflatable camper 10. In cold weather, naturally the entrance 80 may be closed by flexible transparent door 82 and the portholes 58, 60 and 62 closed by the flexible transparent windows 64. After staying at a particular location, if a person desires to move on, all that would be necessary would be that the inflatable camper be deflated to the position as shown in FIG. 3 and rolled up into the bundle as shown in FIG. 2, which is secured by straps 28. The bundle as shown in FIG. 2 may then either be transported or stored.

I claim:

1. An inflatable camper for pickup trucks comprising:
    four generally rectangular inflatable walls including a front wall, a rear wall, and two side walls;
    valve means in at least one of said inflatable walls for inflating or deflating same;
    an inflatable top connected to said inflatable walls;
    flexible floor means connected to a base of said inflatable walls;

internal wall means of said inflatable walls and top to help form said inflatable camper in a general external configuration similar to a pickup truck camper, said internal walls allowing air flow therethrough for said inflating or deflating;

entrance opening in said rear wall for allowing entry into said inflatable camper;

portholes in said inflatable walls to allow light into said inflatable camper, said portholes being covered by flexible releasable transparent material;

screen means secured at said portholes and said entrance opening to prevent most insects from entering said inflatable camper;

flexible door means removably connected to said rear wall for closing said entrance opening;

zipper means for holding said flexible transparent material in position to cover said portholes and to hold said flexible door means and said screen means at said entrance opening; and magnetic strips embedded in said flexible floor means to magnetically hold said flexible floor to the contour of the bed of said pickup truck and embedded in portions of said inflatable walls to magnetically attach to contiguous portions of said pickup truck.

2. The inflatable camper as given in claim 1 including tie down means secured to said side walls for attaching to sides of said pickup truck.

3. The inflatable camper as given in claim 1 wherein said side walls have indentations therein for receiving rear wheel wells of a pickup truck.

4. The inflatable camper as given in claim 3 including recesses in each of said side walls to receive sides of said pickup truck therein so that said inflatable camper is flush with an outermost edge of said pickup truck.

* * * * *